United States Patent
Jin

(10) Patent No.: US 7,924,957 B2
(45) Date of Patent: Apr. 12, 2011

(54) METHOD FOR CREATING BEAMFORMED MULTIPLE-INPUT-MULTIPLE-OUTPUT CHANNELS WITH PARTIAL NULLING

(75) Inventor: Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 847 days.

(21) Appl. No.: 11/873,405

(22) Filed: Oct. 16, 2007

(65) Prior Publication Data

US 2008/0158057 A1      Jul. 3, 2008

Related U.S. Application Data

(60) Provisional application No. 60/853,959, filed on Oct. 24, 2006.

(51) Int. Cl.
    *H04B 7/10*      (2006.01)
(52) U.S. Cl. .......................... 375/347; 375/267
(58) Field of Classification Search .................. 375/260, 375/267, 299, 347; 455/500–503, 103, 132–135
    See application file for complete search history.

(56) References Cited

U.S. PATENT DOCUMENTS

| 6,687,492 | B1 | 2/2004 | Sugar et al. |
| 2003/0003880 | A1 | 1/2003 | Ling et al. |
| 2006/0146725 | A1 | 7/2006 | Li et al. |
| 2007/0060061 | A1* | 3/2007 | Sampath ............ 455/63.1 |

OTHER PUBLICATIONS

International Search Report, dated Apr. 18, 2008 in International Application No. PCT/US07/081700.

* cited by examiner

*Primary Examiner* — Kevin Y Kim

(57) ABSTRACT

The present invention discloses a method for generating beamformed multiple-input-multiple-output (MIMO) channels. The method comprises receiving by a base station (BS) a first plurality of receiving signals transmitted from a first antenna on a mobile station (MS), receiving by the BS a second plurality of receiving signals transmitted from a second antenna on the MS, nulling out a first predetermined percentage of the second plurality of receiving signals to generate a third plurality of receiving signals, calculating a first beamforming weighting vector corresponding to the first antenna on the MS using the first and third pluralities of receiving signals and creating a first beamformed MIMO channel from the BS to the first antenna on the MS using the first beamforming weighting vector.

20 Claims, 3 Drawing Sheets

US 7,924,957 B2

METHOD FOR CREATING BEAMFORMED MULTIPLE-INPUT-MULTIPLE-OUTPUT CHANNELS WITH PARTIAL NULLING

CROSS REFERENCE

The present application claims the benefit of U.S. Provisional Application Ser. 60/853,959, which was filed on Oct. 24, 2006.

BACKGROUND

A typical multiple-input-multiple-output (MIMO) network comprises a base transceiver station (BTS or BS) with multiple antennas and multiple mobile stations (MS), at least one of which has multiple antennas. The performance of an MIMO network can be improved by employing a beamforming technique.

A base transceiver station and a mobile station in an MIMO network employing a beamforming technique communicate with each other with beamformed signals. The BS computes beamforming weighting vectors using receiving signals that are coherently combined. The signals transmitted from the multiple antennas on the BS are weighted based on phase and magnitude so that they will be coherently combined at the receiving MS.

Assuming that there are M antennas on the BS and N antennas on one of the MSs, there will be M×N MIMO channels between the BS and the MS. By applying beamforming weighting vectors to the multiple antennas on the BS, L beamformed channels are created between the BS and the MS, where $L \leq \min(M, N)$. The quality of the beamforming weighting vector is essential to the performance of the L beamformed channels. An optimal beamforming weighting vector maximizes beamforming gain and at the same time achieves the de-correlation of signals on the L beamformed channels so that the receiver of the MS can easily detect MIMO signals.

Several methods have been developed to compute beamforming weighting vectors for the BS using the signals transmitted from the multiple antennas on the MS. The beamforming weighting vectors are applied to the multiple antennas on the BS to de-correlate the transmitting signals on the beamformed channels.

One frequently used method for computing beamforming weighting vectors is to find the primary eigenvector of a covariance eigenvalue problem describing the communication channel. In this method, the signals transmitted from the target antenna are treated as the desired signals while those transmitted from the remaining antennas are treated as interference signals. By partially nulling out the interference signals, the transmitting signals on the beamformed channels are de-correlated As such what is desired is a method and system for creating beamformed MIMO channels with partial nulling.

SUMMARY

The present invention discloses a method for generating beamformed multiple-input-multiple-output (MIMO) channels. The method comprises receiving by a first wireless station a first plurality of receiving signals transmitted from a first antenna on a second wireless station, receiving by the first wireless station a second plurality of receiving signals transmitted from a second antenna on the second wireless station, nulling out a first predetermined percentage of the second plurality of receiving signals to generate a third plurality of receiving signals, calculating a first beamforming weighting vector corresponding to the first antenna on the second wireless station using the first and third pluralities of receiving signals, and creating a first beamformed MIMO channel from the first wireless station to the first antenna on the second wireless station using the first beamforming weighting vector.

The method further comprises nulling out a second predetermined percentage of the first plurality of receiving signals to generate a fourth plurality of receiving signals, calculating a second beamforming weighting vector corresponding to the second antenna on the second wireless station using the second and fourth pluralities of receiving signals, and creating a second beamformed MIMO channel from the first wireless station to the second antenna on the second wireless station using the second beamforming weighting vector.

As embodiments of the present invention, the first wireless station may be either a base station or a mobile station. Similarly, the second wireless station may also be either a base station or a mobile station.

The construction and method of operation of the invention, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The present invention discloses a method for creating beamformed channels in a multiple-input-multiple-output (MIMO) network by nulling out interference signals. The method generates virtual MIMO channels between a base station (BS) equipped with M antennas and at least one mobile station equipped with N antennas. The method turns the M antennas on the BS, which transmit signals in the M×N MIMO network, into L virtual transmitting antennas, where $L \leq \min(M, N)$.

Applying a beamforming weighting vector to create a virtual channel positioned toward desired antennas nulls out the signals transmitted to the undesired antennas partially or completely. The nulling of the signals toward the undesired antennas results in de-correlated signals transmitted on beamformed MIMO channels.

Figure 1:
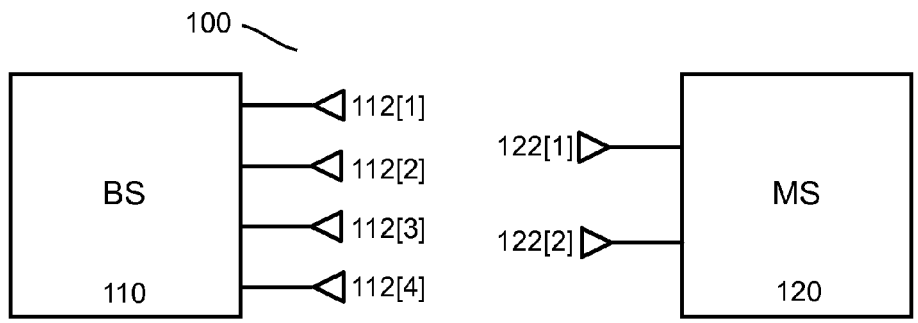
FIG. 1 is a block diagram illustrating a typical 4×2 MIMO network.

FIG. 1 illustrates a typical M×N MIMO network 100 which comprises a base station (BS) 110 and a mobile station (MS) 120. As an example, the BS 110 has four antennas 112[1:4], i.e., M=4. The MS has two antennas 122[1:2], i.e., N=2. A partial nulling beamforming method for effectively utilizing such MIMO network 100 will be described hereinafter.

Figure 2:
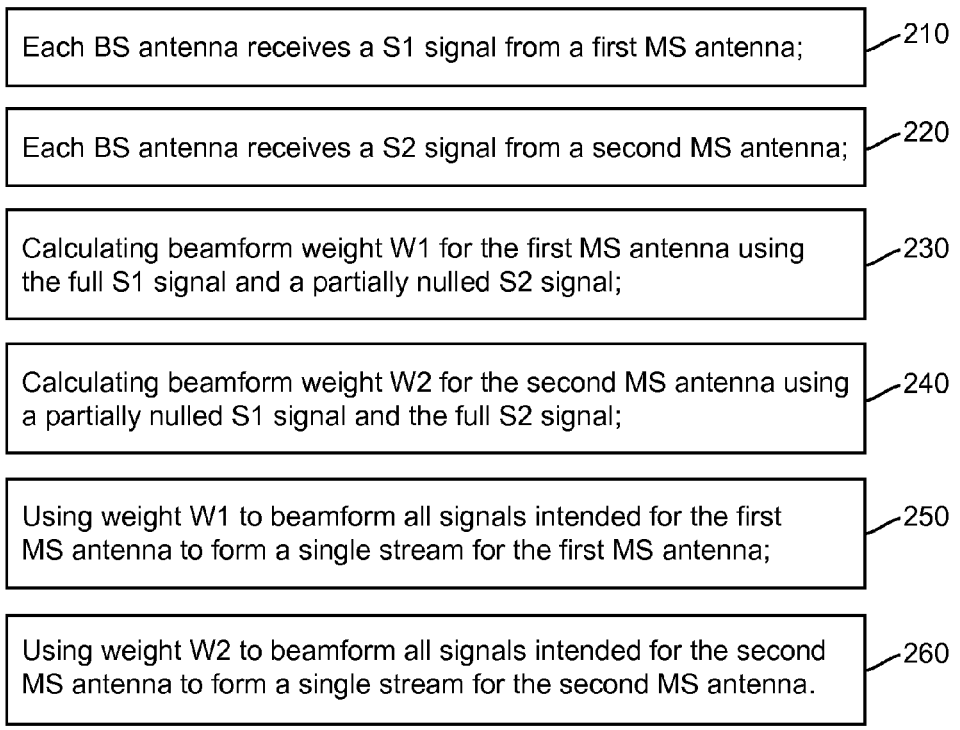
FIG. 2 is a flow chart illustrating a method for creating beamformed MIMO channels in accordance with the present invention.

FIG. 2 is a flow chart illustrating a method for creating beamformed MIMO channels in accordance with the present invention. For illustration purpose, the method is applied to the 4×2 MINO network 100 shown in FIG. 1. The method begins with step 210, in which each antenna 112[1:4] of the BS 110 receives a signal from a first MS antenna 122[1]. For the four antennas 112[1:4], the signals received from the first MS antenna 122[1] are denoted as $S_1 = [S_{11}, S_{12}, S_{13}, S_{14}]$. In step 220, each BS antenna 112[1:4] also receives a signal from a second MS antenna 122[2]. For the four antennas 112[1:4], the signals received from the second MS antenna 122[2] are denoted as $S_2 = [S_{21}, S_{22}, S_{23}, S_{24}]$. In step 230, the BS 110 calculates a beamform weight $W_1 = [W_{11}, W_{12}, W_{13}, W_{14}]$ using the signals $S_1$ and $S_2$. Here, $Norm(W_1) = 1$. Since in this case the signals $S_1$ are chosen as desired signals, and the signals $S_2$ are chosen as interference signals, therefore, while full $S_1$ signals are used, a part of the $S_2$ signals is nulled out in calculating the beamform weight $W_1$.

Similarly, in step 240, the BS 110 calculates a beamform weight $W_2 = [W_{21}, W_{22}, W_{23}, W_{24}]$ using the signals $S_1$, and $S_2$. Here, $Norm(W_2) = 1$. Since in this case the signals $S_2$ are chosen as desired signals, and the signals $S_1$ are chosen as interference signals, therefore, while full $S_2$ signals are used, a part of the $S_1$ signals is nulled out in calculating the beamform weight $W_2$.

In step 250, the beamform weight $W_1$ is used to beamform all signals intended for the first MS antenna 122[1] to form a single signal stream or channel for the first MS antenna 122[1]. Similarly, in step 260, the beamform weight $W_2$ is used to beamform all signals intended for the second MS antenna 122[2] to form a single signal stream or channel for the second MS antenna 122[2].

Figure 3A:
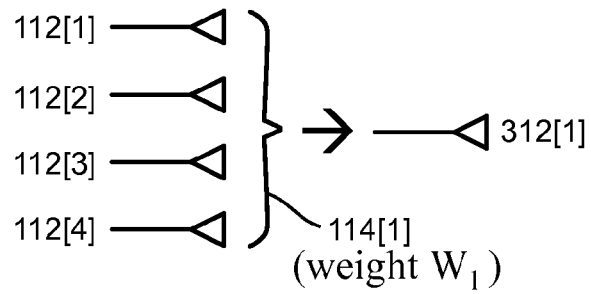
FIGS. 3A~3C are block diagrams illustrating the beamforming process described in FIG. 2.
Figure 3B:
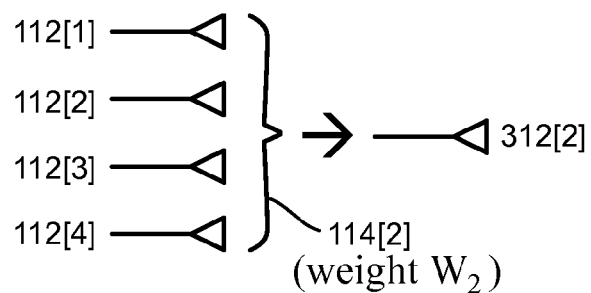
Figure 3C:
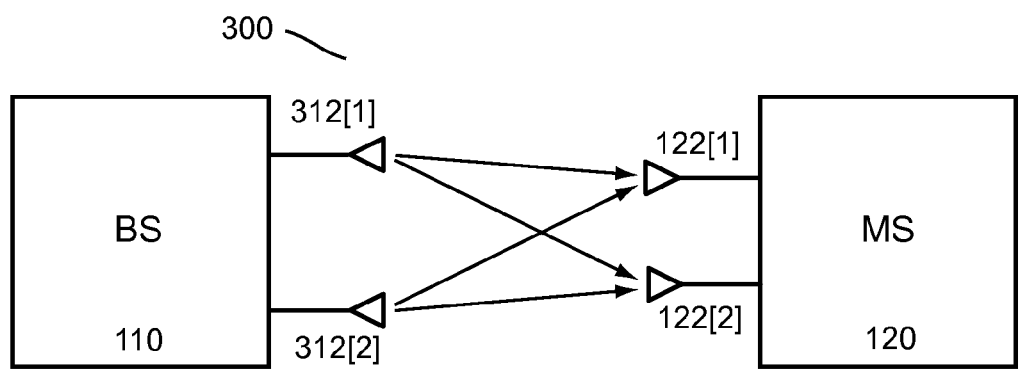

FIGS. 3A~3C are block diagrams illustrating the beamforming process described in FIG. 2. FIG. 3A illustrates that signals received by the four antennas 112[1:4] are used to calculate the beamform weight $W_1$. Then the beamform weight $W_1$ is used for the beamforming described in FIG. 2, which turns the four antennas 112[1:4] to an effective antenna 312[1] that is intended primarily for the first MS antenna 122[1].

Similarly, FIG. 3B illustrates that signals received by the four antennas 112[1:4] are used to calculate the beamform weight $W_2$. Then the beamform weight $W_2$ is used for the beamforming described in FIG. 2, which turns the four antennas 112[1:4] to an effective antenna 312[2] that is intended primarily for the second MS antenna 122[2].

FIG. 3C illustrate the original 4×2 MIMO network 100 is turned into a 2×2 MIMO network 300 through the partial nulling beamforming described in FIG. 2.

A skilled artisan may realize the BS 110 and MS 120 of FIG. 1 may generally be two wireless stations. The beamformed channels may be formed from one wireless station to the other or the other way around. But these beamformed channels are unidirectional, i.e., beamformed channels in one direction are different from beamformed channels in the other direction.

A skilled artisan may also appreciate the aforementioned beamforming method may be applied to any M×N MIMO network to form L beamformed channels. Detailed beamform weight calculation will also be described in more generic terms hereinafter.

Assuming a first wireless station has M number of antennas, and a second wireless station has N number of antennas. The M antennas on the first wireless station receive signals transmitted from the N antennas on the second wireless station. A vector representing the signals transmitted from an antenna i on the second wireless station to the M antennas on the first wireless station is denoted as $S_i$, where $S_i = (S_{i1}, S_{i2}, \ldots, S_{i(M-1)}, S_{iM})$, and $S_{ij}$ represents a signal transmitted from antenna i on the second wireless station to an antenna j on the first wireless station, where $j = 1 \ldots M$.

The first wireless station calculates a beamforming weighting vector $W_i$ for antenna i on the second wireless station with all $S_i$. A weighting vector $W_i$ for antenna i is represented by $W_i = (W_{i1}, W_{i2}, \ldots, W_{i(M-1)}, W_{iM})$, where $Norm(W_i) = 1$. One having skills in the art would recognize that the $Norm(.)$ represents a vector norm.

In computing a weighting vector $W_i$ for antenna i, the signals $S_i$ transmitted from antenna i on the second wireless station to the first wireless station are regarded as desired signals. The signals $S_k$ transmitted from one or more antenna k, where $k \neq i$, on the second wireless station to the first wireless station are regarded as interference signals.

The beamforming weighting vector $W_i$ for antenna i on the second wireless station is the primary eigenvector of the following matrix: $(\alpha * R_i + \sigma_n^2 * I)^{-1} R_s * W_i = \lambda * W_i (1)$, where $R_i$ is the covariance matrix calculated from interference signals; $\sigma_n$ is the standard deviation of channel noises; $R_s$ is the covariance matrix calculated from desired signals; I is the identity matrix; $\lambda$ is the maximum eigenvalue; and $\alpha$ is a scaling factor for nulling out interference signals, where $\alpha < 1$.

The scaling factor $\alpha$ in equation 1 defines the degree of nulling of interference signals. The larger $\alpha$ is, the less correlated the signals in the beamformed MIMO channels are and the smaller the beamformed gain is. The scaling factor $\alpha$ can be changed dynamically according to the operating condition.

N beamformed MIMO channels are created between the first and the second wireless stations by applying the beamformed weighting vectors to the M antennas on the first wireless station.

The method disclosed in the present invention creates a beamforming weighting vector for each receiving antenna so that the effective receiving signals of the receiving antennas will have a certain level of de-correlation. In an ideal case, nulling out all the interference signals de-correlates signals on the beamformed MIMO channels completely, which makes the MIMO signal detection trivial for the receiver of the wireless station. However, applying a beamforming weighting vector to each receiving antenna reduces receiving gain, and the level of reduction is proportional to the degree of nulling of the interference signals.

Figure 4A:
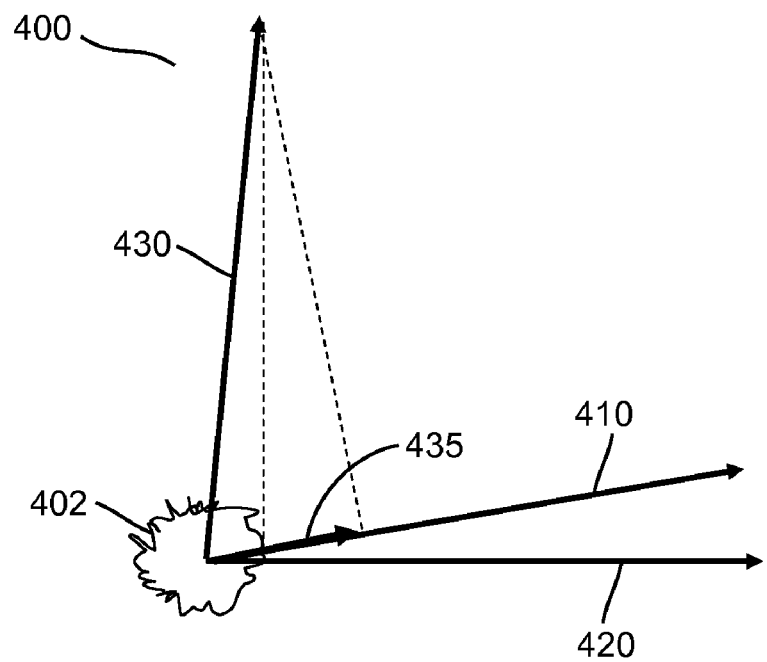
FIGS. 4A and 4B illustrate nulling effect in beamform weight calculation.
Figure 4B:
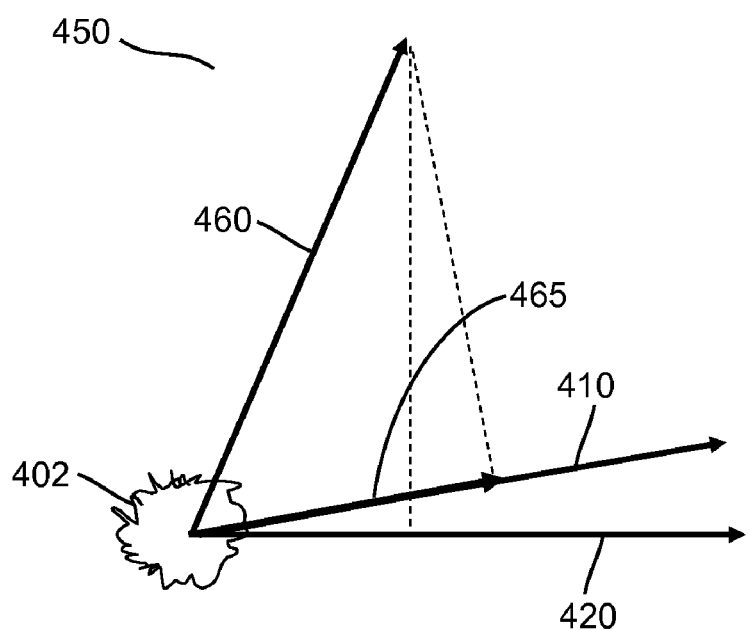

FIGS. 4A and 4B illustrate nulling effect in beamform weight calculation. Here, the beamform weight $W_1$ 430 for the first MS antenna 122[1] of FIG. 1 is to be calculated. Signal noise is represented by 402. Spatial signature for the first and second MS antennas 122[1:2] are represented by 410 and 420, respectively. FIG. 4A depicts a full nulling, and the achieved beamform gain for the first MS antenna 122[1] is represented by 435. FIG. 4B depicts a partial nulling, and the achieved beamform gain for the first MS antenna 122[1] is represented by 465. Apparently, the achieved beamform gain of the full nulling 435 is less than that of the partial nulling 465.

Nulling out 100% of the interference signals incurs a higher level of computational complexity than nulling out a portion of them. However, the change in the receiving gain of the beamformed MIMO channels or in network performance might not be significant in the two scenarios—nulling 100% and nulling a portion of the interference signals.

Therefore, only a portion of the interference signals need to be nulled out when computing beamforming weighting vectors. Partial nulling de-correlates the signals between the desired antenna and the one or more remaining antennas and at the same time reduces the degree of loss in the receiving gain of the beamformed MIMO channels for the desired antenna and the level of computational complexity The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for creating beamformed multiple-input-multiple-output (MIMO) channels, the method comprising:
   receiving by a first wireless station a first plurality of receiving signals transmitted from a first antenna on a second wireless station;
   receiving by the first wireless station a second plurality of receiving signals transmitted from a second antenna on the second wireless station;
   nulling out a first predetermined percentage of the second plurality of receiving signals to generate a third plurality of receiving signals;
   calculating a first beamforming weighting vector corresponding to the first antenna on the second wireless station using the first and third pluralities of receiving signals; and
   creating a first beamformed MIMO channel from the first wireless station to the first antenna on the second wireless station using the first beamforming weighting vector.

2. The method of claim 1, wherein the first plurality of receiving signals are selected from a group comprising data signals and sounding signals.

3. The method of claim 1, wherein the second plurality of receiving signals are selected from a group comprising data signals and sounding signals.

4. The method of claim 1, wherein the first beamforming weighting vector is a primary eigenvector of the following matrix: $(\alpha * R_i + \sigma_n^2 * I)^{-1} R_s * W_i = \lambda * W_i$, where $R_i$ is the covariance matrix calculated from the interference signals; $\sigma_n$ is the standard deviation of channel noises; $R_s$ is the covariance matrix calculated from the desired signals; I is the identity matrix; $\lambda$ is the maximum eigenvalue; and $\alpha$, a scaling factor, depicts the predetermined percentage of the interference signals that are nulled out.

5. The method of claim 1, wherein the first predetermined percentage is determined by a plurality of applications and a plurality of operating environments.

6. The method of claim 1, wherein the first wireless station is a base station and the second wireless station is a mobile station.

7. The method of claim 1, wherein the first wireless station is a mobile station and the second wireless station is a base station.

8. The method of claim 1 further comprising:
   nulling out a second predetermined percentage of the first plurality of receiving signals to generate a fourth plurality of receiving signals;
   computing a second beamforming weighting vector corresponding to the second antenna on the second wireless station using the second and fourth pluralities of receiving signals; and
   creating a second beamformed MIMO channel from the first wireless station to the second antenna on the second wireless station using the second computed beamforming weighting vector.

9. A method for creating beamformed multiple-input-multiple-output (MIMO) channels, the method comprising:
   receiving by a first wireless station a first plurality of receiving signals transmitted from a first antenna on a second wireless station;
   receiving by the first wireless station a second plurality of receiving signals transmitted from a second antenna on the second wireless station;
   nulling out a first predetermined percentage of the second plurality of receiving signals to generate a third plurality of receiving signals;
   nulling out a second predetermined percentage of the first plurality of receiving signals to generate a fourth plurality of receiving signals;
   calculating a first beamforming weighting vector corresponding to the first antenna on the second wireless station using the first and third pluralities of receiving signals;
   calculating a second beamforming weighting vector corresponding to the second antenna on the second wireless station using the second and fourth pluralities of receiving signals;
   creating a first beamformed MIMO channel from the first wireless station to the first antenna on the second wireless station using the first beamforming weighting vector; and
   creating a second beamformed MIMO channel from the first wireless station to the second antenna on the second wireless station using the second computed beamforming weighting vector.

10. The method of claim 9, wherein the first plurality of receiving signals are selected from a group comprising data signals and sounding signals.

11. The method of claim 9, wherein the second plurality of receiving signals are selected from a group comprising data signals and sounding signals.

12. The method of claim 9, wherein the first or second beamforming weighting vector is a primary eigenvector of the following matrix: $(\alpha * R_i + \sigma_n^2 * I)^{-1} R_s * W_i = \lambda * W_i$, where $R_i$ is the covariance matrix calculated from the interference signals; $\sigma_n$ is the standard deviation of channel noises; $R_s$ is the covariance matrix calculated from the desired signals; I is the identity matrix; $\lambda$ is the maximum eigenvalue; and $\alpha$, a scaling factor, depicts the predetermined percentage of the interference signals that are nulled out.

13. The method of claim 9, wherein the first or second predetermined percentage is determined by a plurality of applications and a plurality of operating environments.

14. The method of claim 9, wherein the first wireless station is a base station and the second wireless station is a mobile station.

15. The method of claim 9, wherein the first wireless station is a mobile station and the second wireless station is a base station.

16. A method for creating beamformed multiple-input-multiple-output (MIMO) channels, the method comprising:
- receiving by a base station (BS) a first plurality of receiving signals transmitted from a first antenna on a mobile station (MS);
- receiving by the BS a second plurality of receiving signals transmitted from a second antenna on the MS;
- nulling out a first predetermined percentage of the second plurality of receiving signals to generate a third plurality of receiving signals;
- calculating a first beamforming weighting vector corresponding to the first antenna on the MS using the first and third pluralities of receiving signals; and
- creating a first beamformed MIMO channel from the BS to the first antenna on the MS using the first beamforming weighting vector.

17. The method of claim 16, wherein the first plurality of receiving signals are selected from the group comprising data signals and sounding signals.

18. The method of claim 16, wherein the second plurality of receiving signals are selected from the group comprising data signals and sounding signals.

19. The method of claim 16, wherein the first beamforming weighting vector is a primary eigenvector of the following matrix: $(\alpha*R_i+\sigma_n^2*I)^{-1}R_s*W_i=\lambda*W_i$, where $R_i$ is the covariance matrix calculated from the interference signals; $\sigma_n$ is the standard deviation of channel noises; $R_s$ is the covariance matrix calculated from the desired signals; I is the identity matrix; $\lambda$ is the maximum eigenvalue; and $\alpha$, a scaling factor, depicts the predetermined percentage of the interference signals that are nulled out.

20. The method of claim 16 further comprising:
- nulling out a second predetermined percentage of the first plurality of receiving signals to generate a fourth plurality of receiving signals;
- computing a second beamforming weighting vector corresponding to the second antenna on the MS using the second and fourth pluralities of receiving signals; and
- creating a second beamformed MIMO channel from the BS to the second antenna on the MS using the second computed beamforming weighting vector.

* * * * *